UNITED STATES PATENT OFFICE 2,646,411

POLYVINYL ALCOHOL GELS

Donald E. Sargent, Easton, and William F. Amon, Jr., Riegelsville, Pa., assignors to General Aniline & Film Corporation, New York, N. Y., a corporation of Delaware No Drawing. Application December 23, 1948, Serial No. 67,096

1 Claim. (Cl. 260—29.6)

The present invention relates to the preparation of reversible polyvinyl alcohol gels constituting inter alia, effective substitutes for gelatin in the preparation of silver halide emulsions.

As is well known, natural gelatins are almost universally employed as the protective colloid in photographic emulsions. Despite this fact, these natural products have serious shortcomings which have kindled a strong desire in the art for the creation of gelatin substitutes free from the objections to gelatin.

Among the shortcomings of gelatin are variability in physical properties and in chemical compositions which lead to variations in the physical and photographic properties of the finished photographic emulsion and to variations in the susceptibility of the silver halides thereof to sensitizing and desensitizing substances, developing agents, and the like, brittleness when dry yielding photographic products, the emulsion layers of which crack rather easily, particularly in printing papers; low resistance to the action of bacteria and molds; susceptibility to the action of strongly alkaline or acid reagents; low "melting points" when wet, making it necessary to process the photographic material at relatively low temperatures, i. e., on the order of 15 to 25° C.

Any gelatin substitute which would be free of the aforesaid disadvantages of gelatin would need to possess the gel-forming and protective colloid action of gelatin but with constant physical properties and chemical constitution. Such a material should be capable of bestowing on emulsions constant properties and should be superior to gelatin as a film-forming material and should not be attacked by bacteria or molds.

Considerable work has been done in the photographic field in an effort to supply a material which would possess the above properties and would serve as an effective gelatin substitute. Much of this work has been directed toward the preparation from polyvinyl alcohol of reversible gels by adding to the polyvinyl alcohol gelling agents.

Polyvinyl alcohol is a high molecular weight, water-soluble polymer which yields tough transparent films when its aqueous solution are dried. It is readily available and the chemical and physical properties of any given grade are fairly constant. Commercially it is manufactured by hydrolyzing polyvinyl acetate partially or completely to give a variety of products. The term "polyvinyl alcohol" as herein used also includes water-soluble hydrolyzed polyvinyl esters having a polyvinyl ester content of less than 25%, the remainder being polyvinyl alcohol. The structure of a completely hydrolyzed polyvinyl ester may be represented by the following formula:

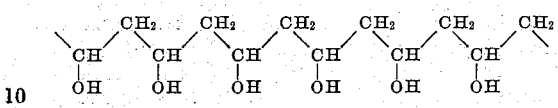

It will be noted from this formula that alternate carbon atoms are substituted by hydroxyl groups. It is to these hydroxyl groups that the water solubility of the product is attributable. There is interaction (hydrogen bonding) between these hydroxyl groups and water and between the hydroxyl groups of adjacent chains so that the solutions in water show an appreciable viscosity. Unfortunately, however, these forces are not sufficient per se to cause the product to gel on standing at room temperature or upon cooling.

Among the proposals to effect gelling of polyvinyl alcohol is that proposed in U. S. P. 2,249,537, which suggests the employment of hydroxy aromatic amides, a typical example being N-2-naphthyl salicylamide of the formula:

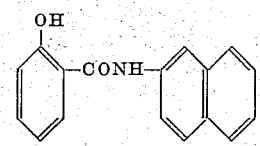

It will be observed that this compound contains two groups, an amide and the hydroxyl, which form strong hydrogen bonds with alcohols in general and with polyvinyl alcohol in particular. If the amide structure, which is ordinarily represented as

is drawn in the form suggested by Sidgwick in "The Organic Chemistry of Nitrogen," Oxford, 1942, page 143

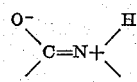

and the hydroxyl group as the ion—

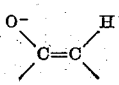

then the structure of polyvinyl alcohol gelled with such an hydroxy amide may be represented as:

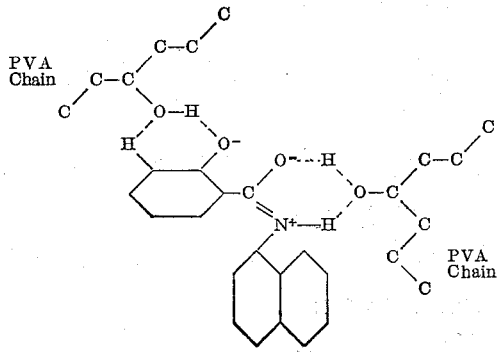

In this structure the hydrogen atoms of the polyvinyl alcohol hydroxyl groups are strongly attracted by the negative charge on the aromatic hydroxyl ions (negatively charged oxygens) and on the amide oxygens. The presence of aromatic structures on either side of the amide group apparently stabilizes the C=N form by conjugation with the double bonds in the rings.

We have now discovered that solutions of polyvinyl alcohol can be very effectively gelled by the use of open chain β-keto amides, i. e., compounds which do not have a ring hydroxyl group positioned ortho to an amide group and in which the amide group does not have aromatic structures on both sides thereof. Despite the fact that these features are lacking in the β-keto amides, nevertheless they are particularly effective in causing the formation of gels from aqueous polyvinyl alcohol, thus providing very effective substitutes for gelatin, particularly in the manufacture of photographic silver halide emulsions.

It is accordingly an object of the present invention to produce gels of polyvinyl alcohol effective as gelatin substitutes by adding to an aqueous solution of polyvinyl alcohol an open chain β-keto amide.

It is a further object of the present invention to produce photographic silver halide emulsions containing as the colloidal binding agent a gel of polyvinyl alcohol containing an open chain β-keto amide as the gelling agent.

Other and further important objects of the invention will become apparent as the description proceeds.

As previously emphasized, the gelling agent which we propose to utilize for converting solutions of polyvinyl alcohol into gels is an open chain β-keto amide. Compounds within this category may be more precisely defined by the following formula:

$$R\text{—[NHCOCH}_2\text{CO—R'}]_x$$

wherein R is an aromatic radical of the benzene or naphthalene series, i. e., phenyl, alkylphenyl, i. e., toluyl, ethylphenyl, alkoxyphenyl, i. e., anisidyl, ethoxyphenyl, halogenphenyl, i. e., chlorophenyl, bromophenyl, halogenalkoxyphenyl, i. e., chloro-dimethoxy-phenyl, chloromethoxy-toluyl, sulfophenyl, diphenyl, dianisidyl, diphenyl urea, di-(carboxyphenyl)-urea, naphthyl, carboxy naphthyl, carboxy alkoxy naphthyl, i. e., carboxy methoxy naphthyl, amino sulfonyl naphthyl, and the like, R' is methyl or a phenyl radical, and x is 1 or 2.

Examples of compounds embraced by this formula and which we have found to be satsifactory for our purpose are acetoacetanilide, benzoylacetanilide, terephthaloylacetanilide, benzoylacetnaphthalide, 7-benzoylacetamido-2-naphthoxy acetic acid of the formula:

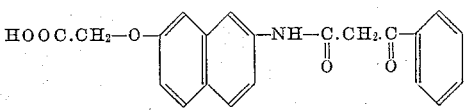

terephthaloyl - bis-[aceto(3-chloro-4,6-dimethoxy) anilide], terephthaloyl-bis-(aceto-4-chloro-6-methoxy toluidide), bis-(acetoacetbenzidide), bis-(benzoylacetbenzidide), 2,4 - bis-(acetoacetamido)-toluene, 2,4-bis-(acetoacetamido) benzene sulfonic acid, bis-(acetoacetdianisidide), 4,4-bis-(benzoylacetamido) - diphenyl urea-3,3'-dicarboxylic acid.

The quantity of the gelling agent which is added will usually range from about 1 to 5% by weight of the polyvinyl alcohol. The polyvinyl alcohol found to be most effective is a water solution containing from about 7 to 10% of polyvinyl alcohol.

It should be emphasized that the gels produced when the above described open chain β-keto amides are added to aqueous solutions of polyvinyl alcohol are thermally reversible, i. e., exist in the gel state at room temperature but become fluid upon heating, a behavior similar to aqueous solutions of gelatin. The "melting point" of these gels will vary with the amount of gelling agent used, the concentration of the polyvinyl alcohol solution used, and somewhat with the type of polyvinyl alcohol used. But in general gels prepared in the above described manner melt at temperatures above 40° C. and "set" to gels below that temperature. Such gels may therefore be conveniently prepared by mixing the polyvinyl alcohol solutions and gelling agents (added, for example, as a suitable aqueous solution) at some temperature above 40° C., such as 50° C., and stirring until a homogeneous fluid is obtained. Upon chilling to some temperature below 40° C., such as 25° C., such fluids rapidly set to stiff gels. Such gels may be rapidly "melted" by heating and "set" by chilling, illustrating their thermal reversibility. It should be understood that gels of much higher melting point, e. g., 75° C. may be prepared by employing the gelling agent in larger amounts.

The open chain β-keto amides are most effective as gelling agents at a pH on the alkaline side. The alkalinity may be supplied by adding the gelling agent in the form of its alkali metal salt, such as the sodium or potassium salt. As is apparent from this, a great excess of alkali is not necessary and this is evident from the fact that the gels prepared with these gelling agents can be washed for many hours with a practically complete removal of all of the alkali originally added to dissolve the gelling agent. Once the gel, or an emulsion made with it, has been coated on a base, set and dried, it withstands either acid or alkali as well as conventional fixing agents.

Photographic emulsions may be prepared with the gelatin substitute hereof by adding a sodium halide to an aqueous solution of the desired polyvinyl alcohol, heating the solution to a temperature of about 40 to 60° C., and adding a water solution of a soluble silver salt while stirring. The fluid silver halide emulsion thus formed is stirred and the desired gelling agent solution containing a small amount of an alkali metal hydroxide, and preferably an inert solvent such as alcohol, dioxane, etc. are added over a period of minutes. The fluid emulsion is then stirred at a temperature within the above range in the dark. After stirring to ripen the emulsion, it may be coated at once without washing on a desired paper base. The coating gels promptly as it cools and it is dried in the dark at room temperature.

Alternatively, the emulsion may be chilled, shredded and washed to remove sodium nitrate or other inorganic salts and re-melted for use in coating photographic film.

The following examples will serve to illustrate the invention, but it is to be understood that these examples are not limitative. The parts are by weight unless otherwise stated.

*Example 1*

Three solutions were prepared as follows:
Solution 1: To 100 parts of a 10% solution of a medium viscosity—completely hydrolyzed polyvinyl alcohol (Du Pont-type RH-349) are added, with stirring, a solution of .9 part of sodium chloride dissolved in 25 parts of distilled water.

Solution 2: 1.875 parts of silver nitrate are dissolved in 15 parts of distilled water.

Solution 3: .4 part of acetoacetanilide is dissolved in .2 part of 10% sodium hydroxide solution, 3 parts of ethyl alcohol and 10 parts of distilled water.

Solution 1 is heated to 50° C. and Solution 2 is added thereto with stirring. After stirring for 5 minutes at 50° C., Solution 3 is added dropwise over a period of 5 minutes. After stirring for an additional 5 minutes, 1 part of an 8% solution of Saponine in water is added and the resulting emulsion is immediately coated at 50° C. on a baryta coated paper. The photographic printing paper so prepared is dried in the dark room at room temperature.

Prints are prepared on this paper in the usual manner by exposing under a negative and developing and fixing in standard reagents. The prints so produced show excellent whites, dense blacks and a broad range of gradation.

Instead of directly coating the emulsion, it may be chilled, shredded and washed to remove sodium nitrate or other inorganic salts and re-melted for use in coating photographic film. This serves to illustrate the thermo reversibility of the gels contemplated herein.

*Example 2*

The procedure is the same as in Example 1 except that Solution 3 was formulated as follows: .4 part of 2,4-bis(acetoacetamido) toluene is dissolved in .2 part of 10% sodium hydroxide solution, 3 parts of dioxane and 10 parts of distilled water. Following the procedure for emulsion formulation and coating as in Example 1, there is obtained a white to very pale yellow coating on baryta.

*Example 3*

The procedure is the same as in Example 2 excepting that the gelling agent used is 2,4-bis-(acetoacetamido)-benzene sulfonic acid. The results obtained are similar to those of Example 2.

*Example 4*

The procedure is the same as in Example 2 excepting that the gelling agent employed is bis-(acetoacetdianisidide). The emulsions obtained are similar to those of Example 2.

*Example 5*

The procedure is the same as in Example 2 excepting that the gelling agent employed is bis-(benzoylacetbenzidide). In this example also, high viscosity—completely hydrolyzed polyvinyl alcohol (DuPont-type RH-391) is employed, a 10% solution being used. Emulsions having characteristics like the emulsions of the preceding examples are produced.

*Example 6*

The procedure is the same as in Example 2 excepting that the gelling agent employed is 4,4'-bis-(benzoylacetamido) - N,N' - diphenylurea-3,3'-dicarboxylic acid. The emulsions produced with this gelling agent have improved characteristics over those obtained according to the other examples.

*Example 7*

The procedure is the same as in Example 2 excepting that there is employed as the gelling agent 7-benzoylacetamido-2-naphthoxy acetic acid. This gelling agent has been found to yield the best emulsions produced with any of the gelling agents described herein.

The 7-benzoylacetamido-2-naphthoxy acetic acid is prepared by fusing 7-aminonaphthalene-2-sulfonic acid with caustic potash to effect replacement of the sulfo group by means of an hydroxyl group. The amino group in the resulting product is then acylated by means of acetic anhydride. The acylaminonaphthol is then heated with sodium hydroxide and choloroacetic acid to effect introduction of the oxyacetic acid group in lieu of the hydroxyl group. The product is then treated with aqueous sodium hydroxide to saponify the acetyl group and to regenerate a free amino group in 7-position to the naphthalene ring. This product is then heated with ethyl benzoyl acetate in the presence of dry dimethyl formamide to yield the desired end product.

The emulsions prepared as above give photographic materials having satisfactory photographic properties and physical properties superior to emulsions prepared with gelatin. This is attributable in part to the fact that the polyvinyl alcohol forms tougher, less brittle layers than gelatin, is more uniform in composition, and is resistant to attack by bacteria and molds. Another very important consideration dictating the utilization of the emulsions contemplated herein is the fact that the polyvinyl alcohol is much less expensive than gelatin.

It should be understood that the gels formed by the addition of a gelling amount of an open-chained $\beta$-keto amide to polyvinyl alcohol solutions can be used for purposes other than the preparation of photographic products. Such gels may be employed, for example, as thickening and gelling agents in cosmetic compositions, water paints, printing inks, and many other applications where thickening or gelling compositions are required.

Various modifications of the invention will occur to persons skilled in the art. For instance, it is evident that in lieu of using sodium chloride in the above examples to produce silver chloride emulsions, potassium bromide may be used for the production of silver bromide emulsions. We therefore do not intend to be limited in the patent granted except as necessitated by the appended claim.

We claim:

A thermally reversible gel having a melting point in the range of 40 to 60° C. composed of a 7 to 10% by weight dispersion of polyvinyl alcohol in water, and from about 1 to 5% based on the weight of the polyvinyl alcohol of the beta - keto amide, 4,4' - bis(benzoylacetamido)-N,N'-diphenylurea-3,3'-dicarboxylic acid.

DONALD E. SARGENT.
WILLIAM F. AMON, Jr.

References Cited in the file of this patent

UNITED STATES PATENTS

| Number | Name | Date |
|---|---|---|
| 2,249,537 | McDowell et al. | July 15, 1941 |
| 2,250,664 | Watkins | July 29, 1941 |
| 2,306,410 | Schinzel | Dec. 29, 1942 |
| 2,464,597 | McQueen | Mar. 15, 1949 |
| 2,513,190 | McQueen | June 27, 1950 |
| 2,576,850 | Murray | Nov. 27, 1951 |